United States Patent [19]

Heim et al.

[11] Patent Number: 4,665,333
[45] Date of Patent: May 12, 1987

[54] SEPARATOR FOR SECURING MAGNETS

[75] Inventors: Edgar Heim, Weichtungen; Horst Voll, Hassfurt, both of Fed. Rep. of Germany

[73] Assignee: FAG Kugelfischer Georg Schafer (KGaA), Fed. Rep. of Germany

[21] Appl. No.: 834,217

[22] Filed: Feb. 27, 1986

[30] Foreign Application Priority Data

Mar. 26, 1985 [DE] Fed. Rep. of Germany ....... 3510845

[51] Int. Cl.$^4$ ........................ H02K 21/26; H02K 1/18
[52] U.S. Cl. ........................................ 310/154; 310/42
[58] Field of Search ..................... 310/67 R, 153, 154, 310/156, 42, 43

[56] References Cited

U.S. PATENT DOCUMENTS

| 3,368,275 | 2/1968 | Eberline et al. | 310/154 |
| 3,789,250 | 1/1974 | Macoit et al. | 310/154 |
| 4,219,752 | 8/1980 | Katou | 310/156 |
| 4,338,533 | 7/1982 | Gräfenschnell | 310/154 |
| 4,488,073 | 12/1984 | Morishita | 310/154 |

FOREIGN PATENT DOCUMENTS 2430122  2/1980  France .................. 310/154

Primary Examiner—Patrick R. Salce
Assistant Examiner—D. L. Rebsch
Attorney, Agent, or Firm—Ostrolenk, Faber, Gerb & Soffen

[57]  ABSTRACT

A separator for accurate positioning and easy replacement of magnets in an annular array around a spindle comprises an annularly shaped, elastic separator constructed of plastic materials. The plastic separator includes either cross machine struts that define open bottom recesses or it includes closed bottom recesses for receiving and accurately positioning and retaining the magnets circumferentially around its annular body. The separator applies an initial stress to the magnets to assure precise positioning. Radially directed projections on the body of the separator are shaped to fit into a groove defined in the interior of a motor housing, whereby the magnets carried by the separator are precisely located relative to the motor housing. The Separator-based magnet fixing means are particularly suitable for disk storage spindle applications.

13 Claims, 5 Drawing Figures

SEPARATOR FOR SECURING MAGNETS

BACKGROUND OF THE INVENTION

The present invention relates to a separator for positioning magnets in motors, and particularly motors for disk storage spindles which require precise axial and radial positioning of the magnets within the housing or the shaft of such spindles.

Present motors of the above type include magnets which are either bonded or potted in place. Expensive tools are required for precise positioning of the magnets within their housings. Moreover, difficult to handle adhesives or potting agents are commonly employed, and these materials can flow into undesirable locations unless careful precautions are taken. Adhesives and potting agents, to be rapidly hardened, must be supplied with heat from ovens, and this introduces yet another expensive operation. Furthermore, once they are fixed in place, the magnets can be checked only on the structural part, which can no longer be removed. Moreover, the necessity for maintaining extremely clean conditions is a general characteristic of motors and particularly motors for disk storage spindles. Prior art methods for fabricating such motors make such conditions difficult to attain and to maintain.

SUMMARY OF THE INVENTION

It is an object of the present invention to provide a magnet separator which avoids the foregoing disadvantages.

It is another object of the present invention to provide such a separator which is simple in construction and permits precise positioning of the magnets within a motor.

It is another object of the present invention to provide a separator, which permit removal of magnets subsequent to their installation.

The foregoing and other objects of the present invention are achieved by means of an elastic separator or cage which fixes the magnets within their motor housing and which avoids the above-noted difficulties which are encountered when bonding or potting agents are used.

For accurate positioning of the magnets, the separator includes holding means which grip the magnets and apply to them an initial stress. The plastic material of the separator may provide the necessary stress. The separator is manufactured independently and includes a body which is shaped to hold the magnets circumferentially around an outer peripheral region. A ring-shaped separator body is particularly suitable for precise radial and circumferential positioning of the magnets in the motor relative to the motor axis. After the separator is cleaned, the magnets are attached to the separator which is then inserted into a housing. For accurate axial positioning of the separator and the magnets which it carries, the separator includes end rings located at opposite axial ends of the separator which will abut against corresponding parts in the housing in which the separator is received. An initially flat separator which may be bent into circular shape upon installation into the housing, may be used to obtain further manufacturing advantages.

Normally, magnets are produced by a sintering process. To prevent detached particles from entering other sections of the motor, the separator may employ a closed tubelike ring design with an outer surface around which the magnets are arranged. In another variation the separator has a cylindrically shaped cage-like body which defines open bottom recesses in which the magnets are located. With the open bottom recess design, the magnets should be covered by a protective lacquer to prevent particles from becoming detached and falling through the recesses toward the axis of the motor. An advantage of the cage-shaped separator is that the required radial space is reduced. To prevent the magnets from falling out of the open recesses, the separator has projections or lugs which grip the magnets on at least two opposite sides of the recesses.

Manufacturing tolerances produce item-to-item variations which affect the uniformity in sizing and dimensioning of the separators and magnets that are obtained. Because the magnets must be positioned rather accurately with respect to each other and with respect to the motor housing to obtain better motor travel, in a preferred embodiment, the separator includes an end ring located at one axial end of the separator to aid the magnet positioning function. The end ring has plastic projections in the recesses which face the axial ends of the magnets. Preferably, the plastic projections are formed of an undulating surface of the end ring which surface includes inwardly curved regions which act like springs and which bear against the ends of the magnets. On the opposite sides, the magnets are restrained by another oppositely located end ring of the separator enabling more accurate positioning of the magnets.

To secure and position the separator in the motor housing, a preferred embodiment provides at least one of the end rings of the separator with radially outwardly directed annular or segmented projections which extend into a facing groove which is defined in the housing. If the groove is located at a precisely determined location in the housing, for instance, at a precise distance from the end of the housing, precise axial positioning of the separator and the magnets is obtained.

Preferably, at least one end ring of the separator is provided with axial threaded holes into which balancing weights can be threadedly introduced. The weights can be fixed accurately, thereby facilitating balancing of the motor.

The separator of the present invention enables rapid mounting of magnets without the need for special jigs. Because the magnets are not integrated with the separator or the motor, replacement and/or repair of structural parts is possible, if desired. This is particularly helpful if the need arises to correct an imbalance in the motor. Corrective steps may include simple replacement of selected parts. The same principle is helpful to obtain a desired electromotive force. Moreover, the maintenance of the special cleanliness conditions associated with disk storage spindles can be easily achieved. Thus, individual parts can be thoroughly cleaned before assembly and simple precautions can assure that dirt will not develop after assembly of the parts. All that is necessary is to assemble the motor in a dust-free room.

Other features and advantages of the present invention will become apparent from the following description of preferred embodiments thereof which are presented below in relation to the accompanying drawings.

DETAILED DESCRIPTION OF PREFERRED EMBODIMENTS

As shown in the Figures, the magnets 1, for which all embodiments of the invention are provided, are annular segment shaped, internally curved to the spindle on which the magnet array is disposed and externally curved to the housing in which the magnet array is positioned.

Figure 1:
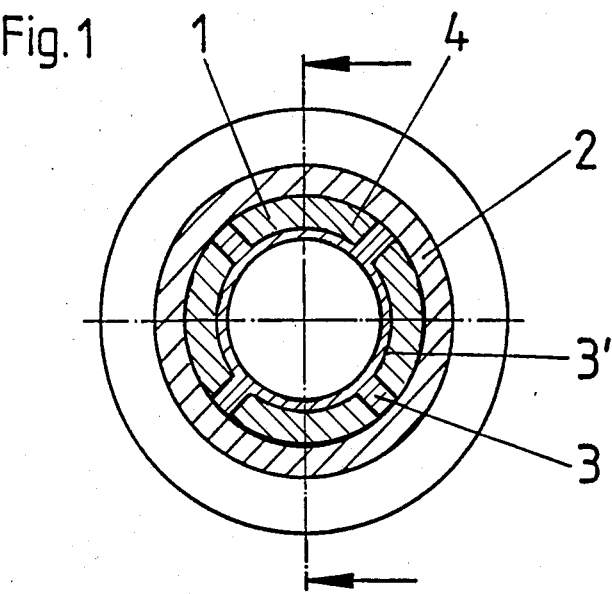
FIG. 1 is a cross-section through a first embodiment of a spindle having a separator according to the present invention.

In accordance with the present invention and as shown in FIG. 1, magnets 1 are located in the bore of housing 2 by means of ring-shaped separator or cage 3 which includes a closed radially internal surface 3' facing a shaft (not shown) which extends axially through the center of the bore of housing 2. The housing 2 is operated inside a stator. Magnets 1 are received and arranged within depressions 4 defined by separator 3. Because magnets 1 are accurately placed with respect to separator 3, and further because separator 3 includes below described means for fixing the separator within housing 2, overall improved radial and axial orientation of magnets 1 within housing 2 is obtained.

Figure 2:
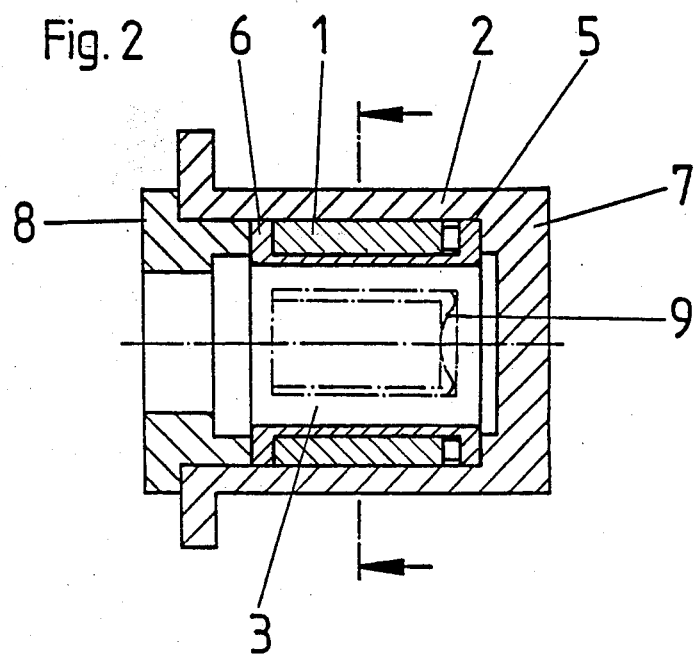
FIG. 2 is a longitudinal section through the spindle of FIG. 1.

Separator 3 has end rings 5, 6 which bear against axially adjacent housing parts 7 and 8, providing accurate axial positioning of separator 3. For precise axial positioning of magnets 1, relative to separator 3, the magnets are pressed, as shown in FIG. 2 by one or more separate spring elements 9 which bear against and are disposed between the magnets and the end ring 6.

Figure 3:
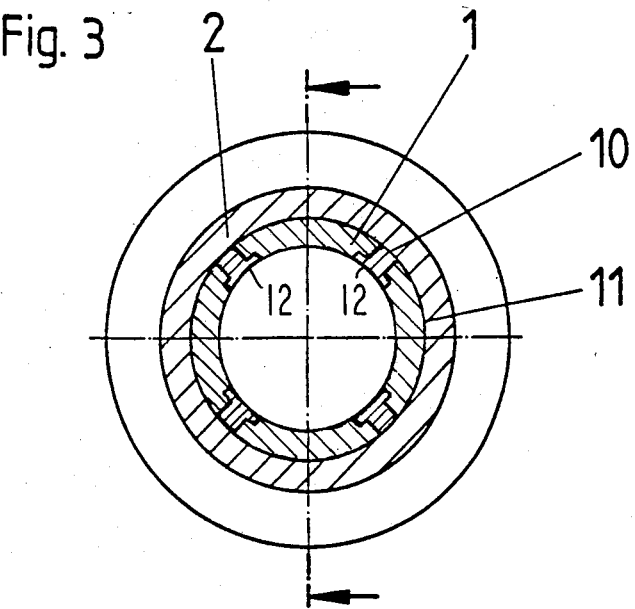
FIG. 3 is a cross-section through a spindle with a second separator embodiment in accordance with the present invention.
Figure 5:
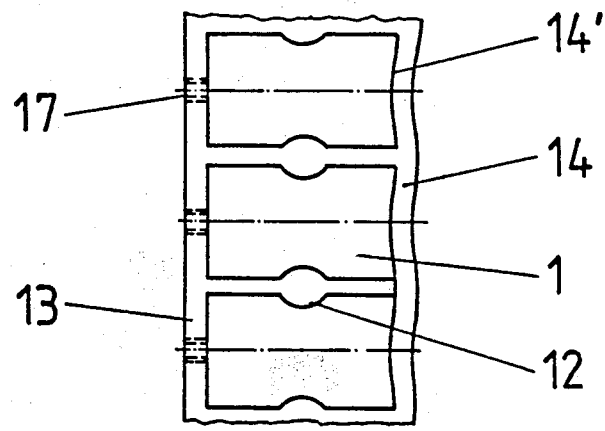
FIG. 5 shows a flat portion on a cage segment of FIG. 3 presented in radial top view.

FIG. 3 depicts a second separator embodiment for affixing magnets 1 within housing 2. The ring-shaped separator 10 has open bottom recesses 11 wherein magnets 1 are received. As shown in FIG. 5, lugs 12 located at the edge of recesses 11 on the cross bars of the separator prevent magnets 1 from falling radially inwardly through recesses 11. FIG. 5 also illustrates one end ring 14 which is elastic and has an undulating or inwardly curved surface for resiliently crossing magnets 1 against the other opposite end ring 13 to provide accurate axial positioning of magnets 1. Elevated portions 14' of the end ring 14 bear elastically against magnets 1.

Figure 4:
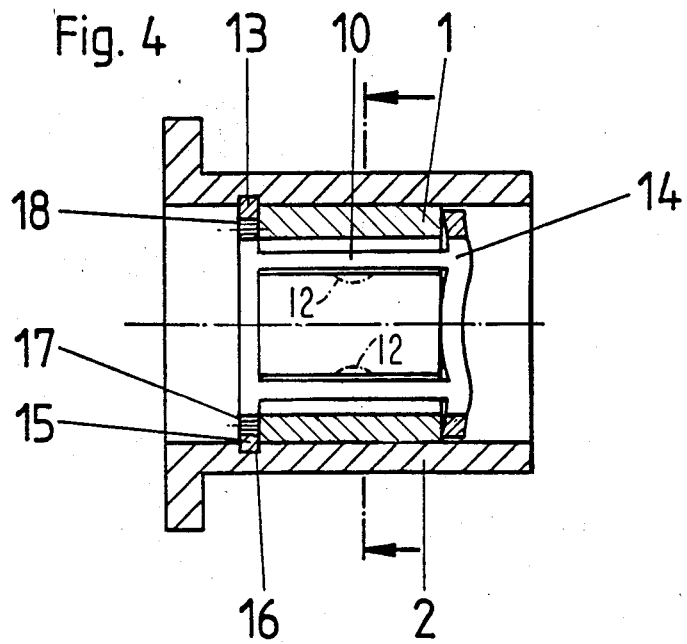
FIG. 4 is a longitudinal section through the spindle of FIG. 3.

As may be noted from FIG. 4, separator 10 is axially positioned and secured within housing 2 by projection 15 formed on end ring 13, which projection 15 is snapped into groove 16 in housing 2.

Axial holes 17 18, are formed in each of end rings 13 and 14. Imbalance correcting balancing weights may be located in holes 17, 18, as necessary.

Although the present invention has been described herein with reference to preferred embodiments thereof, many other inventions and modifications will now become apparent to those skilled in the art. It is preferred therefore that the present invention be limited not by the descriptions provided herein but only by the appended claims.

What is claimed is:

1. A separator for positioning magnets in a motor, comprising:

the motor having a housing and a groove formed in said housing;

the separator having a generally annularly shaped elastic body with an outer circumferential periphery on which the magnets are located, the separator including means for holding the magnets at circumferentially spaced locations around the separator body, the separator including means for applying a resilient force to the magnets to hold the magnets to the separator;

the separator body including a first end ring positioned at one end of the separator body, the separator body including at least one radially directed projection which extends into the groove in the housing; and the means for applying a resilient force comprises the separator body including a second end ring which is elastic and is shaped for resiliently pressing the magnets against the first end ring to provide accurate axial positioning of the magnets.

2. A separator as in claim 1, in which each of the magnets is in the shape of an arcuate annular segment.

3. A separator as in claim 2, in which the magnets are internally curved to conform to a shaft of the motor and externally curved to conform to the shape of a housing of the motor.

4. A separator as in claim 1, wherein the separator body is made of plastic.

5. A separator as in claim 1, in which the magnet holding means includes a plurality of circumferentially spaced depressions arranged on the outer periphery of the separator, each one of the magnets being located in a respective one of the depressions.

6. A separator as in claim 5, in which the separator body comprises an annularly shaped cage which is shaped for defining a circumferential array of open bottom recesses, each recess being for receiving and holding a respective magnet.

7. A separator as in claim 1, wherein the projection is annular.

8. A separator as in claim 1, wherein the projection is annular segmented circumferentially.

9. A separator as in claim 1, which comprises axially directed holes formed in at least one end ring each for receiving a respective balancing weight.

10. The separator of claim 1 in which the first and second end rings are integrated into the separator to form a unit.

11. The separator of claim 1 in which the second end ring includes axially inwardly curved surfaces for applying axial force to the magnets.

12. The separator of claim 11 in which the second end ring inwardly curved surfaces comprise an undulating surface for the second end ring.

13. The separator of claim 1 in which the projection is at the first end ring.

* * * * *